March 4, 1952  F. A. SCHICK  2,588,328
TRACK FRAME MOUNTING FOR CRAWLER TRACTORS
Filed March 17, 1947  2 SHEETS—SHEET 1

INVENTOR
Frederick A. Schick
BY
ATTORNEY

March 4, 1952        F. A. SCHICK        2,588,328
TRACK FRAME MOUNTING FOR CRAWLER TRACTORS
Filed March 17, 1947        2 SHEETS—SHEET 2
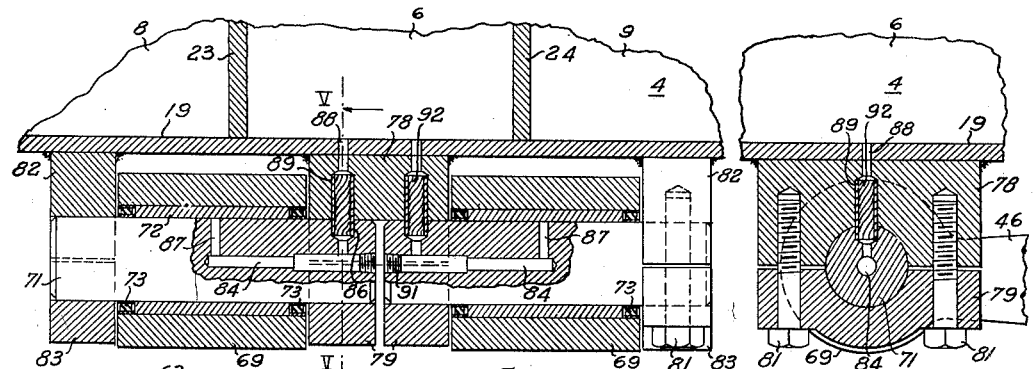
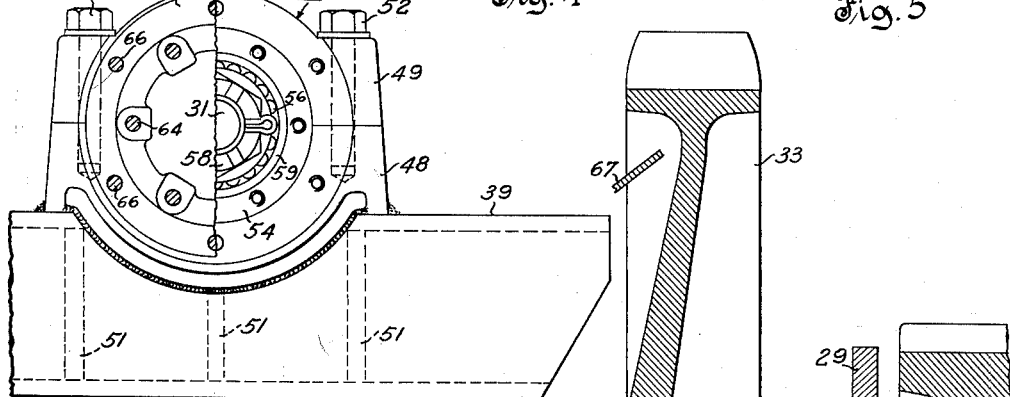
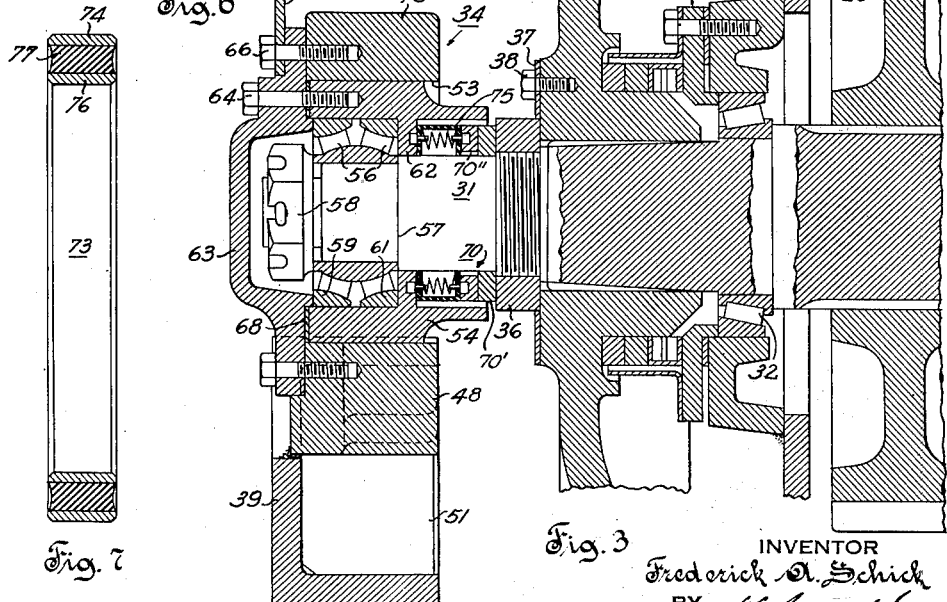
INVENTOR
Frederick A. Schick
BY
ATTORNEY Patented Mar. 4, 1952

2,588,328

UNITED STATES PATENT OFFICE 2,588,328

TRACK FRAME MOUNTING FOR CRAWLER TRACTORS

Frederick A. Schick, Springfield, Ill., assignor to Allis-Chalmers Manufacturing Company, Milwaukee, Wis., a corporation of Delaware Application March 17, 1947, Serial No. 735,195

27 Claims. (Cl. 180—9.1)

The invention relates to vehicles, such as crawler tractors, which are adapted for travel over uneven ground and which are equipped, for that purpose, with swingable supporting frames or swing frames, one at each side of the main body of the vehicle. In the case of crawler tractors, such swing frames are usually referred to as track frames, and they are pivotally mounted, according to established practice, on the main body of the vehicle so as to be swingable up and down relative thereto independently of each other. The invention herein disclosed is concerned with and more particularly directed to an improved mounting of such swing frame or swing frames on the main body of the vehicle.

In order to facilitate assembly, disassembly and repair of vehicles of the mentioned character, it has heretofore been customary, particularly in crawler tractors, to construct the connections between the main body of the vehicle and the swing frames in such a manner that the main body could be assembled into a substantially completed unit preparatory to installation of the swing frames thereon, and so that, on the other hand, only a minimum amount of dismantling work was required in order to permit removal of the main body unit from the swing frames, and conversely, removal of the swing frames from the assembled main body unit.

The requirement for a readily connectable and disconnectable frame mounting, such as outlined hereinbefore, has heretofore been taken care of in crawler tractors, according to a preferred practice, by mounting a transverse supporting axle or a pair of transverse supporting axles on the rearward housing structure of the tractor, that is, on the transmission housing; by mounting a pair of axle brackets, one at each side of the tractor, on said supporting axle or axles; and by detachably securing said axle brackets, respectively, to rearward portions of the track frames at opposite sides of the main body. Such earlier swing frame mountings, however, have had certain shortcomings which are well known in the art, and they have not been entirely satisfactory, particularly in the matter of insuring accurate track alignment, that is, in positioning and maintaining the track frames in highly accurate right-angle relationship to their pivot axis on the main body, which accurate relationship is necessary for efficient and trouble-free functioning of the self-laying track units. The detachable connections between the axle brackets and the track frames, as provided by the mentioned earlier constructions, have also been apt to become inseparable due to the formation of rust and other causes after the tractor had been in service for sometime.

Another common practice which has heretofore been employed in the construction of crawler tractors, particularly for the purpose of providing proper stability of the track frames against toeing in and out and against tilting relative to the main body, has been to pivot each track frame on the transmission housing at two points which are suitably spaced from each other transversely of the tractor and which are usually located in horizontal transverse alignment with each other at the axially inner and outer sides, respectively, of a final drive compartment of the transmission housing. In this type of track frame mounting, each track frame is provided with a forked rear end which straddles the final drive compartment, and the hereinbefore mentioned axle bracket is mounted on the outer leg of the track frame, while the inner leg has a pivot connection with the transmission housing at the underside of the latter, that is, at a place where such inner pivot connection is not readily accessible for servicing. As a result of such difficult access to the inner pivot connection, operators have been apt to neglect its lubrication, and wear of said connection due to lack of lubrication has, in turn, adversely affected the accurate positioning of the track frame relative to the main body which must be maintained, as mentioned hereinbefore, in order to insure efficient and trouble-free functioning of the self-laying track units.

Generally, it is an object of the invention to provide an improved swing frame mounting for crawler tractors and similar vehicles, which will take care of the hereinabove outlined difficulties in a practical and fully satisfactory manner.

More specifically, it is an object of the invention to provide a readily connectable and disconnectable track frame mounting for crawler tractors which will afford a desirably high degree of accuracy in the positioning of the track frames relative to the main body of the tractor; and which will maintain said high accuracy under severe operating conditions, such as vibrations and shocks, and thereby insure efficient and trouble-free functioning of the self-laying track units for long periods of operation.

A further object of the invention is to provide an improved track frame mounting of the hereinabove mentioned character, which incorporates inner and outer pivot connections between the main body of the vehicle and inner and outer legs, respectively, of a forked swing frame, and in which true and permanent alignment of such inner and outer pivot connections with reference to the track frame may be obtained in a simple, efficient and inexpensive manner.

A further object of the invention is to provide an improved track frame mounting for crawler tractors, which will be self-centering during assembly, or in other words, which will automatically take care of minor misalignments of the main body and a track frame upon relative engagement of complementary load bearing elements which are associated, respectively, with the main body and with the track frame.

A further object of the invention is to provide an improved detachable pivot connection between the main body and a swing frame of a vehicle of the character set forth hereinbefore, which improved connection is not apt to wear loose under shocks and continuous vibrations, and which, on the other hand, will not be liable to rust up or otherwise deteriorate to an extent which would make it difficult or impossible to properly disconnect the main body and swing frame when desired, as for instance for purposes of replacement or repair after a prolonged operating period of the vehicle.

A further object of the invention is to provide an improved detachable pivot connection of the character set forth hereinbefore which will be particularly adapted for connecting a live axle shaft of a crawler tractor in rotatable and load transmitting relation to a vertically swingable track frame.

A further object of the invention is to provide for adequate lubrication of the hereinabove mentioned pivot connection between the inner leg of a forked swing frame and the transmission housing of a crawler tractor, and more particularly to provide for such lubrication in a simple, reliable, efficient and fully automatic manner.

These and other objects and advantages are attained by the present invention, novel features of which will be apparent from the disclosure herein and accompanying drawings disclosing an embodiment of the invention, and will be more particularly pointed out in the appended claims.

In the drawings:

Fig. 3 is an enlarged sectional view on line III—III of Fig. 1;

Fig. 4 is an enlarged sectional view on line IV—IV of Fig. 1;

Fig. 5 is a sectional view on line V—V of Fig. 4;

Fig. 6 is a side view, in the direction of arrow VI in Fig. 2, of a bracket and bearing structure including an end cover at the left side of the tractor, only one half of the end cover being shown at the left of Fig. 6 for the purpose of exposing, at the right of Fig. 6, parts which are hidden by said end cover; and Fig. 7 is an enlarged sectional view of an oil seal appearing in Fig. 4.

Figure 1:
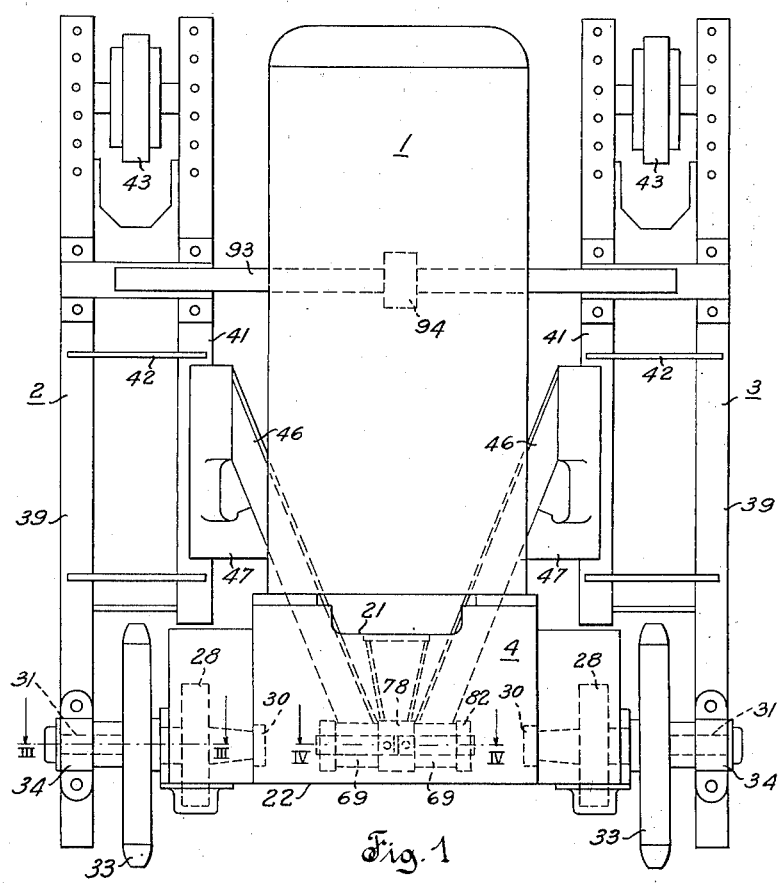
Fig. 1 is a generally schematic top view of a crawler tractor without track belts.
Figure 2:
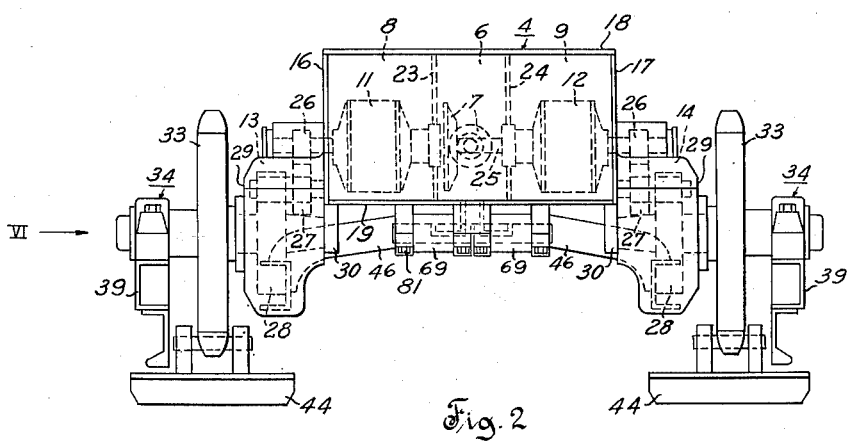
Fig. 2 is a generally schematic rear view of the tractor shown in Fig. 1 and including portions of the track belts at opposite sides of the tractor.

Features of the herein disclosed crawler tractor, and more particularly of the drive axle and track frame mounting shown in Figs. 1 and 2 hereof, are claimed in a copending application Serial No. 732,029, filed on March 3, 1947, by William F. Wilson for Drive Axle and Track Frame Mounting for Crawler Tractors.

The tractor shown in Figs. 1 and 2 is of the three-point suspension type and comprises a main body which is generally indicated by the reference character 1, and two self-laying track units at opposite sides, respectively, of the main body, the self-laying track unit at the left side of the main body incorporating a track or swing frame which is generally indicated in Fig. 1 by the reference character 2, and the self-laying track unit at the right side of the main body incorporating a track or swing frame generally indicated by the reference character 3, and which is an opposite hand duplicate of the swing frame 2.

The main body 1 of the tractor generally conforms with conventional principles of construction in that it comprises a large rearwardly located transmission housing which is generally indicated by the reference character 4, and the usual frame structure extending forwardly therefrom and including a power plant and accessories, not shown.

The transmission housing 4 is shown in the drawings as being constructed in the form of a fabricated structure which comprises a welded assembly of a number of plate or sheet steel members. Generally, the transmission housing is an integral structure which, as shown in Fig. 2, is internally partitioned to provide a central wet compartment 6 for a bevel gear and pinion drive 7, two dry compartments 8 and 9 for steering clutches 11 and 12, respectively, and two final drive compartments 13 and 14. A pair of vertically disposed and transversely spaced intermediate walls 16 and 17 of the transmission housing are connected by top and bottom walls 18 and 19 as indicated in Fig. 2, and vertically disposed front and rear walls 21 and 22 indicated in Fig. 1 extend between and merge with the intermediate walls 16 and 17 and with the top and bottom walls 18 and 19. Partitions 23 and 24 divide the space defined by the walls 16, 17, 18, 19, 21 and 22 into the mentioned wet compartment 6 and into the two dry compartments 8 and 9. The bevel gear and pinion drive 7 forms part of a conventional mechanism for transmitting power from the tractor engine to the steering clutches 11 and 12; a common drive shaft 25 for the two steering clutches being rotatably mounted in the partitions 23 and 24, for carrying the driving members of the clutches 11 and 12 at its opposite ends. The construction of the steering clutches conforms with established principles and while the arrangement of the bevel gear and pinion drive 7 and of the steering clutches is schematically indicated in Fig. 2, the showing of the said arrangement has been omitted in Fig. 1 in order to clarify details of the track frame mounting which will be discussed hereinbelow.

A final drive gear train within the final drive compartment 13 of the transmission housing 4 comprises a driving pinion 26, an intermediate gear 27 and a large driven gear 28, the driving pinion 26 being suitably mounted in axial alinement with the steering clutch 11 and connected in driven relation with the driven member of the latter, and the large driven gear being nonrotatably secured to a live axle shaft 31 which is rotatably mounted in opposite side walls 16 and 29 of the final drive compartment 13, and retained in axially fixed position relative thereto by means of conical roller bearings 30 and 32.

Referring to Fig. 3, the live axle shaft 31 is rotatably supported in an opening of the wall 29 of the final drive compartment 13 by means of the roller bearing 32, and an axially extending portion of the live axle shaft 31 projects laterally from the transmission housing 4. A track belt drive sprocket 33 is non-rotatably secured to the live axle shaft 31 at the left side of the tractor, and a portion of the axle shaft 31 at the axially outer end of the latter extends into an outboard bearing which is generally indicated by the reference character 34 and which cooperates with the axle shaft 31 to rotatably connect the latter in supported relation with the track frame at the left side of the tractor, as will be discussed in fuller detail hereinbelow. The hub of the track belt drive sprocket 33 has tapered axially extending splines in engagement with correspondingly tapered axially extending splines on the axle shaft 31, and a nut 36 is drawn up on a threaded portion of the shaft 31 against the sprocket 33 to securely connect the sprocket and shaft in non-rotatably and axially fixed relation to each other. A locking plate 37 for the nut 36 is secured to the hub of the sprocket 33 by screws 38.

Referring to Fig. 1, the track frame 2 at the left side of the main body 1 comprises an outer side channel 39, an inner side channel 41 and a suitable intervening structure 42 between the two side channels which is rigidly secured thereto, preferably by welding, in order to maintain the side channels 39 and 41 in fixed parallel relation to each other. Rotatably and reciprocably mounted at the forward end of the track frame 2 between the side channels 39 and 41, is a track belt supporting idler 43 which is backed by a conventional recoil or track release mechanism, not shown, in conformity with established practice. Also mounted on the track frame 2, at the lower side thereof and in conformity with established practice, are a series of track engaging rollers, not shown, which bear upon the lower run of an endless track belt 44 which is partly indicated in Fig. 2 and which is trained about the track belt drive sprocket 33 and the front idler 43. The track frame 2 is forked at its rear end, as best shown in Fig. 1, a diagonal brace 46 being secured to the inner side channel 41 and extending laterally and rearwardly under the main body 1 of the tractor. The forward portion of the diagonal brace 46 is attached to the side channel 41 by means of a foot piece 47 which is rigidly secured, preferably by welding, to the side channel 41 and to the brace 46. Designating the rearwardly extending portion of the outer side channel 39 at the axially outer side of the track belt drive sprocket 33 as the outer leg of the forked track frame 2, and designating the diagonal brace 46 as the inner leg of the forked track frame, it will be noted from Figs. 1 and 2 that these two legs straddle the final drive compartment 13 of the transmission housing 4, the side channel 41 being shorter than the side channel 39 and terminating in front of the final drive compartment 13. Suitable pivot connections, which will be described more fully hereinbelow, are provided to connect the track frame 2 at its forked rear end to the main body 1 for up and down movement relative thereto about a transverse axis coinciding with the axis of the live axle shaft 31.

Referring to Figs. 3 and 6, the outboard bearing 34 at the left side of the tractor is constructed as follows. A bracket structure or outboard support which is split on a horizontal plane through the axis of the axle shaft 31 into a base 48 and into a cap 49, extends upwardly from the side channel 39 at the axially outer side of the drive sprocket 33, the top flange and part of the web of the channel 39 being cut out to accommodate portions of the bracket base 48. A lower, rounded portion of said base is cradled within and welded to the cut out web portion of the side channel 39, and foot pieces of the base 48 are secured to the top flange of the channel by welding along the front edge of the forward foot piece and by welding along the rear edge of the rearward foot piece. The connection between the bracket base 48 and the channel 39 is reinforced by vertical webs 51 which are secured in place by welding inside of the channel 39. The cap 49 is held down on the base 48 by a pair of long vertical cap screws 52 which are threaded into tapped holes of the base 48. A semi-circular cylindrical upper surface of the base 48 forms an arcuate recess in the top portion of the latter and is formed concentrically with a complementary semi-circular cylindrical surface or arcuate recess in the cap 49 to provide a cylindrical opening 53 (Fig. 3) at the rear end of the track frame 2 above the side channel 39.

An annular bearing cage 54 (Figs. 3 and 6) has an axially extending cylindrical portion within the cylindrical opening 53 of the bracket structure 48, 49, the outside diameter of said cylindrical portion of the cage 54 closely matching the diameter of the opening 53, so that the cage will have no radial play within the opening 53 upon tightening of the cap screws 52, and on the other hand, will not be distorted by such tightening of said cap screws.

The annular bearing element or cage 54 surrounds an axially extending portion of the live axle shaft 31 at the axially outer side of the nut 36, and a self-alining double-row roller bearing 56 is operatively interposed between the shaft 31 and the cage 54. The inner race of the bearing 56 abuts a shoulder 57 of the shaft 31, and a castellated nut 58 on a threaded end portion of the shaft 31 is drawn up against said inner race and locked by a cotter pin so as to secure the inner race of the bearing 56 in axially fixed position on the shaft 31. Two outer races 59 and 61 of the roller bearing 56 are fitted into the bearing cage 54, the outer race 61 abutting an internal radial flange 62 of the cage, and the outer race 59 being axially engaged by a short annular lip of an end cover 63. A circumferential series of relatively long cap screws 64 secure the end cover 63 to the bearing cage 54, and another circumferential series of shorter cap screws 66 secure the end cover 63 to the bracket base 48 and to the bracket cap 49. A suitable number of shims 68 are interposed between the bearing cage 54 and the end cover 63 for the purpose of adjusting the axial play of the double-row roller bearing 56. In conformity with usual practice a suitable guard 67 for the track belt drive sprocket 33 is arranged at the axially outer side of the latter, such guard being of generally dished construction and secured in position by the cap screws 66 in the bracket cap 49, as indicated in Fig. 3.

The bearing cage 54 has an annular skirt portion at the axially inner side of the flange 62 in radially spaced relation to the axle shaft 31, which projects axially from the bracket 48, 49 at the inner side of the latter, and which terminates in proximity of the nut 36. The mentioned skirt portion surrounds a rotary shaft seal 70 which is operatively interposed between the flange 62 of the bearing cage 54 and the nut 36 on the shaft 31. The seal 70, as shown, is of the axial contact type and may be constructed as disclosed, for instance in U. S. Patent 2,358,830, September 26, 1944, F. A. Schick, for Track Roller Seal. The bearing cage 54 and the cap 63 form an enclosure for the roller bearing 56, and the purpose of the seal 70 is to prevent the escape of lubricant from said enclosure, provisions for admitting lubricant to the enclosure being made in any suitable manner, not shown. In accordance with the disclosure of the mentioned U. S. Patent 2,358,830, the seal 70 shown in Fig. 3 hereof comprises an abutment ring 70' which is connected with the shaft 31 for rotation in unison therewith, an axially shiftable sealing ring 70" which bears axially against the abutment ring 70', and a resilient backing unit 75 for the sealing ring 70", the backing unit 75 being operatively interposed between the flange 62 of the bearing cage 54 and the sealing ring 70" so as to connect the sealing 70" in fluid tight, axially shiftable and nonrotatable relation with the bearing cage 54.

From the foregoing description, it will be seen that the live axle shaft 31 which is mounted on the main body of the tractor, constitutes a supporting shaft which has an axially extending portion within the annular bearing element 54 in cooperative relation therewith, to establish a load transmitting pivotal connection between said main body and the track frame 2 at the left side of the tractor. It will be further noted that the annular bearing element 54 is detachably secured on the bracket structure 48, 49 against displacement radially and longitudinally of its axis, the bolting of the cap member 49 upon the bracket base 48 securing the bearing element 54 against radial displacement, and the bolting of the end cover 63 to the bearing element 54 and to the bracket structure 48 and 49 securing the bearing element against axial displacement.

The diagonal brace 46 of the track frame 2 is pivotally connected to the main body of the tractor under the transmission housing 4, so that the track frame will be properly stabilized against toeing in and out and against lateral tilting relative to the tractor main body. Referring to Figs. 1, 4 and 5, an eye 69 is integrally formed with the brace 46 at the rear end of the latter, as by forging, and a pivot pin 71 is rotatably mounted in the eye 69 by means of a bushing 72, the pin projecting axially from the eye 69 at the opposite sides of the brace or inner leg 46 of the track frame 2. The axial length of the bushing 72 is somewhat shorter than the transverse width of the eye 69, and a pair of oil seals 73 are operatively interposed between the eye 69 and the pivot pin 71 at the axially opposite ends of the bushing 72. The oil seals 73 are identically constructed, and an enlarged section of one of these seals is shown in Fig. 7. An outer ring 74 of each of the seals 73 is press fitted into the axial bore of the eye 69 and an inner ring 76 of each of the seals is press fitted upon pivot pin 71. An annular body 77 of rubber-like, oil resistant material is arranged in the space between the rings 74 and 76 to completely close the annular space between these rings. The body 77 of rubber-like material is preferably bonded to the inner surface of the ring 74 and to the outer surface of the ring 76 and has sufficient elasticity to accommodate oscillation of the eye 69 within the required limits relative to the pin 71, the latter being non-rotatably mounted on the transmission housing 4 as will appear more fully hereinbelow.

The axially inner end of the pin 71, which is shown in section in Fig. 5, is embraced by a horizontally split bracket structure which comprises a base portion 78 and a cap member 79, the base portion 78 being fixedly secured to the bottom wall 19 of the transmission housing 4 directly under the wet compartment 6, as by welding, and the cap 79 being drawn up into engagement with the pin 71 by a pair of cap screws 81 which are threaded into tapped holes of the bracket base 78. The axially outer end of the pin 71 is similarly secured to the transmission housing 4 by means of a bracket structure which embraces the pin 71 and comprises a bracket base 82 and a cap 83 (Fig. 4), the cap 83 being drawn up into engagement with the pin by another pair of bolts 81, as indicated in Fig. 2.

The pivotal pin 71 has an internal passage 84 which connects a first opening 86 at the axially extending portion of the pin within the bracket structure 78, 79 with a second opening 87 at the axially extending portion of the pin which is rotatably embraced by the eye 69 of the diagonal brace arm 46. The bracket structure which embraces the axially inner end of the pin 71 has an internal passage 88 in communication with the first opening 86 of the pivot pin and in communication with the transmission housing 4 and, more specifically with the interior space thereof defined by the wet compartment 6. The passage 88 in the bracket base 78 is counterbored from below, and a tubular dowel element in the form of a hollow dowel pin 89 is press fitted into the counterbored portion of the bracket base 78. The internal passage 84 of the pivot pin 71 is counterbored at the opening 86, and the lower portion of the dowel pin 89 extends into the counterbored portion of the pivot pin 71, the diameter of the counterbore in the pin 71 being slightly larger than the outside diameter of the dowel pin 89 and the lower end of the dowel pin being chamfered so to provide for ready assembly of the dowel pin 89 and the pivot pin 71.

In the assembled condition of the parts, as shown in Fig. 4, the dowel pin 89 locks the pivot pin 71 against rotary and axial displacement relative to the bracket base 78. The internal passage 84 is preferably formed by drilling an axial bore into the pin 71 and by subsequently closing the open end of such bore at the axially inner end of the pin by a threaded plug 91. The mentioned first and second openings 86 and 87 of the pin are formed by radial bores in communication with the mentioned axial bore as shown in Fig. 4.

In order to provide for lubrication of the bevel gear drive 7 in the wet compartment 6 of the transmission housing, a suitable supply of lubricant is stored in such compartment in conformity with usual practice, and it will be noted that the passages 88 and 84 which are connected in fluid-tight relation with each other by the hollow dowel pin 89 provide for discharge of lubricant from the interior of the wet compartment 6 to the complementary wearing surfaces of the rotary connection between the pivot pin 71 and the inner leg of the track frame 2, such wearing surfaces being represented by the cylindrical outer surface of the pin 71 which is embraced by the bushing 72 and by the inner surface of said bushing surrounding the pin 71. The seals 73 at the axially opposite ends of the bushing 72 prevent loss of lubricant from the wet compartment 6 and serve to retain lubricant discharged through the passage 88 and 84, in communication with said complementary wearing surfaces of the inner pivot connection between the track frame 2 and the transmission housing 4.

A felt wick 92 is placed inside the hollow dowel pin 89 for the purpose of preventing accidental drainage of the wet compartment 6 under certain conditions, for instance, if repairs of the tractor should make it necessary to remove the track frames, in which case the bearing caps 79 and 83 would have to be detached and the pin 71 would have to be removed from the bracket bases 78 and 82. In case of failure of one of the oil seals 73, the wick 92 also serves to prevent unduly quick drainage of the wet compartment 6. Generally, the wick 92 constitutes an oil permeable element associated with the lubricant conduit means represented by the passages 84, 88 and dowel pin 89 so as to retard the passage of lubricant through said conduit means, and the discharge of lubricant from the wet compartment 6 through said conduit means is controlled by said wick, as well as by the oil seals 73.

The track frame mounting which has been explained hereinbefore with reference to the left side of the tractor shown in Figs. 1 and 2 is substantially duplicated at the right side of the tractor, that is, the track frame 3 is connected to the main body 1 by means of inner and outer pivot connections which correspond as to their arrangement and construction to the inner and outer pivot connections which have been explained hereinbefore in connection with the track frame 2. The explanations hereinabove with respect to the pivot mounting of the track frame 2 on the main body similarly apply to the pivot mounting of the track frame 3, the same reference characters being used in Figs. 1, 2 and 4 to designate duplicate parts with reference to the construction and mounting of the self-laying track mechanisms at opposite sides of the tractor. From Fig. 4, it will be noted that the bracket base 78 under the wet compartment 6 of the transmission housing 4 is found by a single block whose width transversely of the tractor is about twice the width of each bracket base 82, and that the axially inner ends of the two pivot pins 71 are seated in a common arcuate recess of the bracket base 78. The internal passages 84 of the two pivot pins 71 communicate independently of each other with the interior space of the wet compartment 6 through the internal passages 88 of their common bracket base 78.

A forward load supporting connection between the main frame 1 and the track frames 2 and 3 comprises a transverse leaf spring 93 which, as shown in Fig. 1, is pivoted intermediate its ends on the main body 1 at 94, and which has opposite end portions bearing loosely upon top portions of the track frames 2 and 3. Generally the leaf spring 93 serves the same purpose and performs the same function as the transverse leaf spring in a conventional tractor of the three-point suspension type.

The mounting of the track frames 2 and 3 on the main body of the tractor as disclosed herein is such that the main body may be preassembled into a substantially completed unit preparatory to the installation of the track frames 2 and 3 thereon. That is, the engine and all of the power transmitting mechanism up to and including the track belt drive sprockets may be installed on the main body before the track frames 2 and 3 are attached hereto, and it will be noted that the preassembled main body unit may also include the bearing cages 54, the double-row roller bearings 56, the seals 70, and if desired, the end covers 63, at the opposite sides of the main body. Each of the track frames 2 and 3, on the other hand, may be assembled into a substantially completed unit preparatory to its attachment to the main body, and such preassembled track frame unit may include the bracket base 48 at the rear end of the outer side channel 39, and also, at the brace 46, the bushing 72, pivot pin 71, and oil seals 73.

The cap member 49 of the outboard bearing 34 is preferably only partly finished before the circular opening 53 is formed on the bracket structure 48, 49, that is, the bracket cap 49 is initially finished by straight milling of its lower surface which contacts the top surface of the bracket base 48, by drilling the holes for the reception of the cap screws 52, and by spot facing the cap to provide seats for lock washers under the heads of the cap screws 52. Similarly, the bracket base 48 is preferably only partly finished before the circular opening 53 is formed, the initial finishing of the bracket base 48 including the necessary straight milling of its top surface to match the straight milled lower surface of the cap 49. With the initially finished bracket base 48 welded in position on the track frame 2, and with the initially finished bearing cap 49 bolted to the initially finished bracket base 48, the bearing structure is then bored or finished to form the circular opening 53. This opening provides an arcuate bearing surface which, in the assembled condition of the parts, as shown in Fig. 3, extends straight in the direction of the axis of the outer and inner pivot connections between the main body and the swing frame 2. In order to provide for accurate axial alinement of the bore 53 in the bracket structure 48, 49 with the axial bore in the eye 69 of the brace arm 46, this latter bore is preferably formed in one setting with the boring of the bracket structure 48, 49.

A procedure similar to the hereinabove explained procedure of forming the circular opening 53 and the axial bore in the eye of the brace 46, may be followed to form the straight cylindrical bores in the bracket structures 78, 79 and 82, 83 for mounting the pivot pins 71, and to form the cylindrical bearing seats for the live axle shafts 31, all in highly accurate alinement with each other on the main body of the tractor.

Designating the bracket base 48 of the outboard bearing 34 as a first bracket element, and the bracket bases 78 and 82 as second and third bracket elements, respectively; and further designating the bracket caps 49, 79 and 83 as first, second and third cap members, respectively, it will be noted that the first cap member 49 is detachably fastened by the bolts 52 on the track frame 2 in cooperative relation with the annular bearing element 54 and the latter is thereby secured in the recessed top portion of the first bracket element 48; and that the second and third cap members 79 and 83 which underlie the pivot pin 71 are detachably fastened on the transmission housing 4 in cooperative relation with said pivot pin and the latter is thereby secured in the recessed portions of the second and third bracket elements 78 and 82.

Preparatory to attachment of the track frame 2 to the main body of the tractor, the bracket cap 49 is removed from the bracket base 48 and the pivot pin 71, bushing 72, and seals 73 are installed in the eye of the diagonal brace 46. The preassembled main body unit of the tractor including the annular bearing cages 54 may then readily be lowered upon the preassembled track frame unit, it being understood that the bracket caps 79 and 83 of the inner pivot connection are detached from the bracket bases 78 and 82 preparatory to such lowering of the preassembled main body unit upon the track frame. While a certain amount of care will be required to engage the annular bearing cage 54 with the arcuate seat on the bracket base 48 and to engage the arcuate seats of the bracket bases 78 and 82 with the pivot pin 71, it is not necessary to maneuver the main body and track frame, as by prying, into precisely alined relation to each other because minor initial misalinements will be automatically taken care of when the bearing cage 54 enters the arcuate recess of the bracket base 48 and when the pivot pin 71 enters the arcuate seats on the bracket bases 78 and 82. The coaction of the bearing cage 54 with the bracket base 48 and the coaction of the pivot pin 71 with the bracket bases 78 and 82 insures positioning of the track frame 2 in a highly accurate right-angle relationship to its pivot axis on the main body, and the track frame will be permanently secured in said highly accurate relation to the main body upon bolting the bracket cap 49 to the bracket base 48, and upon bolting the bracket caps 79 and 83 to the bracket bases 78 and 82, respectively. After both track frames 2 and 3 have been mounted on the main body in the described manner, they will be positioned in accurate parallel relation to each other and in precisely right angle relationship to the common axis of the live axle shafts 31, which will insure proper functioning of the self-laying track units without undue wear.

Considering the illustrated embodiment of the invention from a general point of view, it will be noted that the bearing cage 54, which is rotatably mounted on the live axle shaft 31, represents an upper load transmitting element which forms part of the outer pivot connection between the main body and the swing frame 2, and that either of the bracket bases 78 and 82, by means of which the pivot pin 71 is mounted on the main body, represents another upper load transmitting element which forms part of the inner pivot connection between the main body and the swing frame 2. The cylindrical outer periphery of the bearing cage 54 represents a convex bearing surface concentric with the axis of said pivot connections, and the semicylindrical surface of either of the bracket bases 78, 82 represents a concave bearing surface concentric with the axis of the two pivot connections. In other words, each of the mentioned upper load transmitting elements has an arcuate bearing surface concentric with the axis of said pivot connections. It will further be noted that the bracket base 48 on the outer leg of the swing frame 2 and the pivot pin 71 on the inner leg of said swing frame represent a pair of lower load transmitting elements forming complementary parts, respectively, of said outer and inner pivot connections and having arcuate bearing surfaces matching the arcuate bearing surfaces of said upper load transmitting elements, respectively; the arcuate bearing surface of the lower load transmitting element 48 being concave, and the arcuate bearing surface of the lower load transmitting element 71 being convex. The lower load transmitting elements 48 and 71 are mounted on the swing frame 2 in underlying relation to the upper load transmitting elements 54 and 78 (82), and said bearing surfaces of said upper load transmitting elements are vertically movable out of load bearing engagement with said bearing surfaces of said lower load transmitting elements 48, 72, so that the main body of the tractor together with the upper load transmitting elements 54 and 78 (82), may be separated, as an assembled unit from the swing frame 2 and lower load transmitting elements thereon by straight vertical upward movement of said assembled unit relative to the swing frame. The caps 49, 79, and 83 and their associated retaining bolts represent means for releasably retaining the mentioned assembled unit comprising the tractor body, axle shaft 31 and bearing cage 54 and bracket bases 78, 82, against said straight upward movement relative to the swing frame 2.

From Figs. 5 and 6, it will be noted that the downwardly facing convex bearing surface which is provided by the cylindrical outer periphery of the bearing cage 54, extends below a horizontal plane through the axis of the outer and inner pivot connections between the main body and swing frame 2, and that the downwardly facing concave bearing surfaces of the bracket bases 78 and 82 extend above said horizontal plane.

With reference to the pivot structure which connects the outer leg of the swing frame 2 with the vehicle body, it will be noted that the bracket structure 48 which is secured to said outer leg has a recessed portion formed by the lower half of the circular opening 53, and that said recessed portion is engageable with the bearing cage 54 at one side of a plane through the axis of the latter so as to determine an angularly fixed position of said bearing cage relative to the swing frame 2. The cap member 49 is engageable with the bearing cage 54 at the other side of said plane, and the bolts 52, as well as the end cover 63 and bolts 66, constitute detachable connecting means between the cap member 49 and the bracket structure 48 for releasably securing the bearing cage 54 in said angularly fixed position relative to the swing frame 2.

With reference to the pivot structure which connects the inner leg 46 of the swing frame 2 with the vehicle body, it will be noted that the bracket bases 78 and 82 are mounted on the vehicle body in spaced relation to each other longitudinally of the horizontal axis on which the swing frame 2 is pivoted on the vehicle body, and that each of the bracket bases 78, 82 has a downwardly facing arcuate recess concentric with said axis and above a horizontal plane through the latter. The axially opposite end portions of the pivot pin 71 are seated, respectively, in said arcuate recesses of the bracket bases 78, 82 so as to aline the pivot pin 71 with said pivot axis, and the caps 79 and 83 are detachably secured to the vehicle body, in the present instance through the intermediary of the bracket bases 78, 82, and in cooperative engagement, respectively, with said end portions of the pivot pin 71 for releasably retaining the latter in said arcuate recesses of the bracket bases 78, 82.

It will be further noted that the bracket base 48 is secured to the underlying rearward portion of the track frame 2 by a fused metal connection, that is, by a permanent rather than a separable connection, and that the cap 49 is secured to the bracket base by detachable rather than nonseparable connecting means. The provision of said fused metal connection and of said detachable connecting means in the manner described hereinbefore insures a rugged mounting of the bearing cage 54 on the track frame 2, which mounting is not apt to work loose under severe operating conditions such as vibration and shocks.

Moreover, the shanks of the bolts 52 are fully enclosed by the bracket base 48 and cap 49, and the threads of these bolts are therefore not apt to rust up or become damaged in operation of the tractor.

In the operation of the tractor, the track frames 2 and 3 are subject to more or less continuous oscillation about the common axis of the live axle shafts 31 and pivot pins 71, and it will be seen that proper functioning of the inner pivot connections at the underside of the transmission casing 4 will be permanently insured by adequate and automatic supply of lubricant to the wearing surfaces of these pivot connections from the interior of the transmission casing. The provision of such automatic lubrication of the inner pivot connections, avoids undue wear of the bushings 72 due to neglect on the part of the operator, and thus insures the highly accurate positioning of the track frames relative to the main body, which is necessary for efficient and trouble-free functioning of the self-laying track units.

It should be understood that it is not intended to limit the invention to the particular forms and details described hereinabove and that the invention includes such other forms and modifications which are embraced by the scope of the appended claims.

It is claimed and desired to secure by Letters Patent:

1. In a crawler tractor having a forked track frame pivotally connected at its outer leg to an axle shaft and at its inner leg to a housing structure mounting said axle shaft, the combination of an annular bearing element mounted on said axle shaft at its axially outer end in rotatable relation thereto, a first bracket element integrally connected with said outer leg of said track frame and having an upwardly facing arcuate recess seating said annular bearing element, a first cap member overlying said bearing element, means for detachably fastening said first cap member on said track frame in cooperative relation with said bearing element and thereby securing the latter in said arcuate recess of said first bracket element, a pivot pin rotatably mounted on said inner leg of said track frame, second and third bracket elements integrally connected with said housing structure and having downwardly facing arcuate recesses, respectively, seating said pivot pin at opposite sides of said inner leg, second and third cap members underlying said pivot pin, and means for detachably fastening said second and third cap members on said housing structure in cooperative relation with said pivot pin and thereby securing the latter in said recesses of said second and third bracket elements.

2. A tractor comprising, in combination, a main body including a transmission housing, running gear including a forked swing frame straddling a final drive compartment of said transmission housing, a pivot connection between the inner leg of said swing frame and said transmission housing, and conduit means associated with said pivot connection and affording a passage for the discharge of lubricant from an interior space of said transmission housing to complementary wearing surfaces of said pivot connection outside of said transmission housing.

3. A tractor comprising the combination of elements as recited in claim 2, and means for controlling the discharge of lubricant from said interior space of said transmission housing through said conduit means.

4. A tractor comprising the combination of elements as recited in claim 2 and an oil permeable element associated with said conduit means so as to retard the passage of lubricant through the latter.

5. A tractor comprising the combination of elements as recited in claim 2 and means for retaining lubricant discharged from said interior space of said transmission housing through said conduit means, in communication with said complementary wearing surfaces of said pivot connection.

6. A tractor comprising the combination of elements as recited in claim 2, an oil permeable element associated with said conduit means so as to retard the passage of lubricant through the latter, and means detachably associated with said transmission housing for retaining lubricant discharged through said oil permeable element, in communication with said wearing surfaces of said pivot means.

7. A tractor comprising, in combination, a main body including a transmission housing, running gear including a forked swing frame straddling a final drive compartment of said transmission housing, a pivot pin having a rotary connection at one axially extending portion thereof with the inner leg of said swing frame, and means including a bracket structure embracing another axially extending portion of said pivot pin, for securing said pivot pin in fixed relation to said transmission housing, said pivot pin having an internal passage connecting a first opening at said one axially extending portion thereof with a second opening at said other axially extending portion thereof, and said bracket structure having an internal passage in communication with said second opening of said pivot pin and with said transmission housing, to provide for discharge of lubricant from an interior space of said transmission housing to complementary wearing surfaces of said rotary connection between said pivot pin and said inner leg of said swing frame.

8. A tractor comprising the combination of elements as set forth in claim 7, and a pair of oil seals operatively interposed between said inner leg of said swing frame and said pivot pin at opposite sides, respectively, of said first opening of the latter.

9. A tractor comprising the combination of elements as set forth in claim 7, in which said bracket structure includes a detachable cap member, and in which a tubular dowel element extends from said internal passage of said bracket structure into said internal passage of said pivot pin through said second opening of the latter.

10. A tractor according to claim 7, in which a tubular dowel element extends from said internal passage of said bracket structure into said passage of said pivot pin through said second opening of the latter, and in which an oil permeable element is inserted into said tubular dowel element to retard the discharge of lubricant through the latter.

11. A tractor comprising, in combination, a multicompartment transmission housing including a central wet compartment and lateral final drive compartments, running gear including a forked swing frame straddling one of said final drive compartments, a pivot connection between a rearward portion of the inner leg of said swing frame and said transmission housing at the underside of the latter and in proximity to said wet compartment, conduit means affording a passage for the discharge of lubricant from said wet compartment to complementary wearing surfaces of said pivot connection, and sealing means associated with said pivot connection for retaining lubricant discharged from said wet compartment through said conduit means, in communication with said complementary wearing surfaces of said pivot connection.

12. A tractor comprising, in combination, a main body including a transmission housing, running gear including a swing frame having an arm underlying said transmission housing, a pivot pin extending axially through and journaled in an eye portion of said arm, and bracket means embracing axially extending portions of said pivot pin, at opposite sides, respectively, of said eye portion, for mounting said pivot pin on said transmission housing, said bracket means comprising, at each side of said eye portion, a base member secured to said transmission housing, and a cap member detachably connected with said base member.

13. A tractor as set forth in claim 12, in which said base members are secured to and extend downwardly from a bottom wall of said transmission housing, and in which said cap members are detachably secured, respectively, to said base members in underlying relation thereto.

14. A tractor as set forth in claim 12, in which a dowel element is operatively interposed between said pivot pin and said bracket means to lock said pivot pin against displacement relative to said bracket means.

15. A tractor as set forth in claim 12, in which the portion of said pivot pin embraced by said bracket means at one side of said eye portion has a radial bore registering with a bore in the adjacent base member of said bracket means, and in which a dowel pin is inserted into said bores to lock said pivot pin against displacement relative to said bracket means.

16. A tractor as set forth in claim 12, in which a pair of oil seals are operatively interposed between said pivot pin and said eye portion at opposite sides, respectively, of the latter.

17. In a tractor having a main body, running gear including a swing frame, and coaxial outer and inner pivot connections between said main body and swing frame, the combination of a pair of upper load transmitting elements forming parts, respectively, of said outer and inner pivot connections and each being mounted on said main body and having an arcuate bearing surface concentric with the axis of said pivot connections, a pair of lower load transmitting elements forming complementary parts, respectively, of said pivot connections and having arcuate bearing surfaces matching said arcuate bearing surfaces of said upper load transmitting elements, respectively; said lower load transmitting elements being mounted on said swing frame in underlying relation to said upper load transmitting elements, and said bearing surfaces of the latter being vertically movable out of load bearing engagement with said bearing surfaces of said lower load transmitting elements, so that said main body and upper load transmitting elements may be separated, as an assembled unit, from said swing frame and lower load transmitting elements thereon by straight vertical upward movement of said assembled unit relative to said swing frame, and means for releasably retaining said assembled unit against said upward movement relative to said swing frame.

18. A tractor comprising the combination of elements as set forth in claim 17, and in which the arcuate bearing surfaces of said upper and lower load transmitting elements extend straight in the direction of the axis of said pivot connections.

19. In a tractor having a main body, running gear including a swing frame, and coaxial outer and inner pivot connections between said main body and swing frame, the combination of a pair of upper load transmitting elements mounted on said main body, one forming part of one of said pivot connections and having a convex bearing surface concentric with the axis of said pivot conections and below a horizontal plane through said axis, and the other having a concave bearing surface concentric with said axis and above said plane, a pair of lower load transmitting elements mounted on said swing frame, one of said lower load transmitting elements forming a complementary part of said one pivot connection and having a concave bearing surface in engagement with said convex bearing surface of said one upper load transmitting element, and the other of said lower load transmitting elements having a convex bearing surface in engagement with said concave bearing surface of said other upper load transmitting element, so that said main body and upper load transmitting elements may be separated, as an assembled unit, from said swing frame and lower load transmitting elements thereon by straight vertical upward movement of said assembled unit relative to said swing frame, and means for releasably retaining said assembled unit against said upward movement relative to said swing frame.

20. A tractor comprising the combination of elements as set forth in claim 19, and in which the upper load transmitting element having said convex bearing surface forms part of said outer pivot connection, and in which the upper load transmitting element having said concave bearing surface forms part of said inner pivot connection.

21. A tractor comprising the combination of elements as set forth in claim 19, and in which the lower load transmitting element having said convex bearing surface is mounted on said swing frame for rotation relative thereto about the axis of said pivot connections.

22. In a tractor having a main body, running gear including a swing frame, and coaxial outer and inner pivot connections between said main body and swing frame, the combination of a shaft element mounted on said main body and forming part of one of said pivot connections, an upper load transmitting element rotatably mounted on said shaft element and having a convex bearing surface concentric with the axis of said pivot connections, another upper load transmitting element mounted on said main body and forming part of the other of said pivot connections, said other load transmitting element having an arcuate bearing surface concentric with the axis of said pivot connections, a lower load transmitting element forming a complementary part of said one pivot connection and having a concave bearing surface matching said convex bearing surface of said rotatable upper load transmitting element, another lower load transmitting element forming a complementary part of said other pivot connection and having an arcuate bearing surface matching said arcuate bearing surface of said other upper load transmitting element, said lower load transmitting elements being mounted on said swing frame in underlying relation to said upper load transmitting elements, and said bearing surfaces of the latter being vertically movable out of load bearing engagement, respectively, with said bearing surfaces of said lower load transmitting elements, so that said main body, shaft element and upper load transmitting element may be separated, as an assembled unit, from said swing frame and lower load transmitting elements thereon by straight vertical upward movement of said assembled unit relative to said swing frame, and means for releasably retaining said assembled unit against said upward movement relative to said swing frame.

23. A tractor comprising the combination of elements as set forth in claim 22, and in which said shaft element and said upper load transmitting element which is rotatably mounted thereon are secured against relative displacement radially of the axis of said pivot connections, and in which said means for releasably retaining the main body, shaft element and upper load transmitting elements against upward movement relative to the swing frame comprise a detachable connection between said upper load transmitting element and said swing frame.

24. A pivot structure for connecting a swing frame to a vehicle body at the underside of a housing structure of the latter, said pivot structure comprising, in combination, a pivot pin, bearing means associated with said swing frame outside of said housing structure and mounting said pivot pin on said swing frame in rotatable relation thereto, bracket means formed on said housing structure and mounting said pivot pin at said underside of the latter in nonrotatable relation thereto, and conduit means associated with said pivot pin and communicating with said bearing means and with said housing structure to afford a passage for the discharge of lubricant from an interior space of said housing structure to the wearing surface of said bearing means.

25. A pivot structure for connecting a swing frame on a horizontal axis to the underside of a vehicle body, comprising, in combination, a pair of bracket members mounted on said vehicle body in spaced relation to each other longitudinally of said axis and each having a downwardly facing arcuate recess concentric with said axis and above a horizontal plane through the latter, a pivot pin mounted intermediate its ends on a portion of said swing frame in rotatable relation thereto and having end portions extending in axially opposite directions from said swing frame portion at opposite sides, respectively, of the latter, said swing frame portion being disposed between said bracket members, and said end portions of said pivot pin being seated, respectively, in said arcuate recesses of said bracket members so as to aline said pivot pin with said axis, and a pair of cap members detachably secured to said vehicle body in cooperative engagement, respectively, with said end portions of said pivot pin for releasably retaining the latter in said arcuate recesses of said bracket members.

26. In a tractor, the combination of a main body having outwardly extending rearward axle portions at its opposite sides, respectively; a pair of swing frames at said opposite sides, respectively, of said main body; a pair of outboard supports one for each of said axle portions and each being split into a base portion having an upwardly facing concave load bearing surface and into a cap portion having a complementary downwardly facing concave load bearing surface; fused metal connections securing said base portions, respectively, to said swing frames; detachable connecting means between said base and cap portions of each of said outboard supports; and detachable connecting means between said main body and swing frames operative to stabilize said swing frames against toeing in and out and against lateral tilting relative to said main body.

27. In a tractor, the combination of a main body having outwardly extending rearward axle portions at its opposite sides, respectively; a pair of swing frames having rearward side portions in underlying relation, respectively, to said axle portions; a pair of annular bearing elements rotatably mounted, respectively, on said axle portions; a pair of outboard supports one for each of said bearing elements and each being horizontally split into a base portion having an upwardly facing arcuate surface in radial load transmitting engagement with a lower part of the respective bearing element and into a cap portion having a complementary downwardly facing arcuate surface in radial load transmitting engagement with an upper part of the respective bearing element; fused metal connections securing said base portions to said rearward side portions, respectively, of said swing frames; detachable connecting means between said base and cap portions of each of said outboard supports, and detachable connecting means between said main body and swing frames operative to stabilize said swing frames against toeing in and out and against lateral tilting relative to said main body.

FREDERICK A. SCHICK.

REFERENCES CITED

The following references are of record in the file of this patent:

UNITED STATES PATENTS

| Number | Name | Date |
| --- | --- | --- |
| 1,815,339 | Turzicky | July 21, 1931 |
| 2,033,156 | Shafer | Mar. 10, 1936 |
| 2,048,933 | Johnston et al. | July 28, 1936 |
| 2,156,565 | Johnston et al. | May 2, 1939 |
| 2,225,233 | Rogers et al. | Dec. 17, 1940 |
| 2,297,485 | Lentz | Sept. 29, 1942 |
| 2,349,898 | Bechman | May 30, 1944 |